US010690892B2

(12) United States Patent
Sedazzari

(10) Patent No.: US 10,690,892 B2
(45) Date of Patent: Jun. 23, 2020

(54) TELECENTRIC LENS

(71) Applicant: OPTO ENGINEERING S.R.L., Mantova (IT)

(72) Inventor: Claudio Sedazzari, Mantova (IT)

(73) Assignee: OPTO ENGINEERING S.R.L., Mantova (IT)

( * ) Notice: Subject to any disclaimer, the term of this patent is extended or adjusted under 35 U.S.C. 154(b) by 16 days.

(21) Appl. No.: 15/559,337

(22) PCT Filed: Feb. 26, 2016

(86) PCT No.: PCT/IB2016/051076
§ 371 (c)(1),
(2) Date: Sep. 18, 2017

(87) PCT Pub. No.: WO2016/147071
PCT Pub. Date: Sep. 22, 2016

(65) Prior Publication Data
US 2018/0113284 A1    Apr. 26, 2018

(30) Foreign Application Priority Data

Mar. 18, 2015  (IT) ............... BS2015A0043

(51) Int. Cl.
*G02B 13/22* (2006.01)
*G02B 27/00* (2006.01)
*G02B 17/02* (2006.01)
*G02B 27/14* (2006.01)
*G02B 26/08* (2006.01)

(52) U.S. Cl.
CPC .......... *G02B 13/22* (2013.01); *G02B 17/023* (2013.01); *G02B 27/0025* (2013.01); *G02B 26/0816* (2013.01); *G02B 26/0825* (2013.01); *G02B 27/141* (2013.01)

(58) Field of Classification Search
CPC . G02B 13/22; G02B 26/0816; G02B 27/0025
See application file for complete search history.

(56) References Cited

U.S. PATENT DOCUMENTS

2003/0086062 A1   5/2003  Shevlin
2005/0179962 A1   8/2005  Williamson

FOREIGN PATENT DOCUMENTS

| EP | 1681556 A1 | 7/2006 |
|---|---|---|
| EP | 2594983 A1 | 5/2013 |
| JP | 2003344771 A | 12/2003 |

(Continued)

OTHER PUBLICATIONS

International Search Report and Written Opinion issued in International Patent Application No. PCT/IB2016/051076, dated May 31, 2016 (11 pages).

*Primary Examiner* — Jack Dinh
(74) *Attorney, Agent, or Firm* — Arent Fox LLP

(57) ABSTRACT

A telecentric lens comprises a front optical group (20) defining a front optical axis (k), at least a first rear optical group (40), defining a rear optical axis (k'), and at least one lens aperture (30) positioned between the front optical group 20 and a respective rear optical group. Between the front optical group (20) and the lens aperture (30) are inserted at least two reflective or semi-reflective elements arranged in such a way that at least a part of the rays coming from the front optical group undergoes at least one double reflection before reaching the rear optical group (40).

18 Claims, 14 Drawing Sheets

(56) References Cited

FOREIGN PATENT DOCUMENTS

| JP | 2006267899 A | 10/2006 |
|---|---|---|
| WO | WO 2006/050337 A2 | 5/2006 |
| WO | 2009130062 A1 | 10/2009 |
| WO | WO 2012/073178 A2 | 6/2012 |

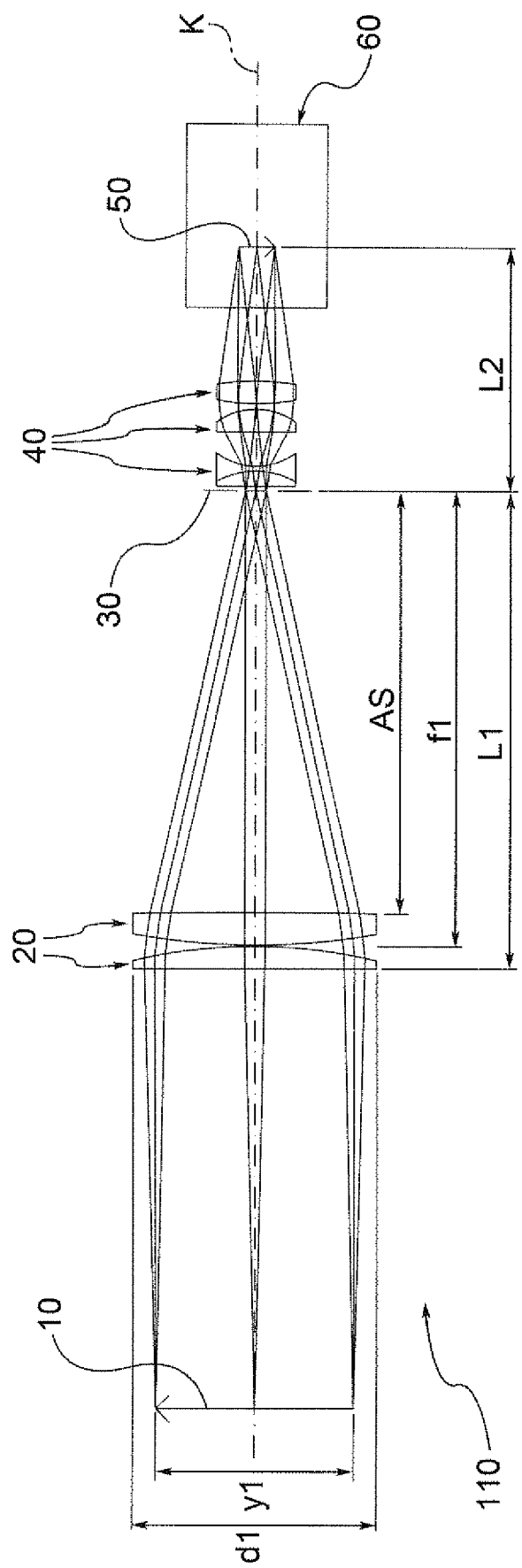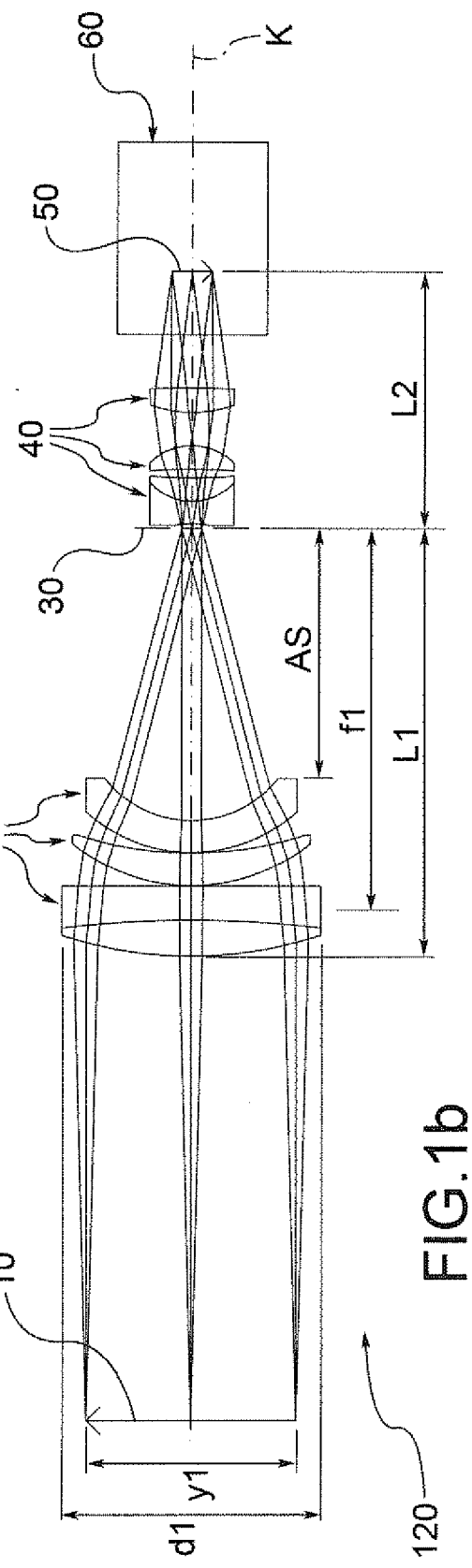
FIG.1a
FIG.1b

TELECENTRIC LENS

CROSS-REFERENCE TO RELATED APPLICATIONS

This application is the U. National Stage Application of International Patent Application No. PCT/IB2016/051076, filed on Feb. 26, 2016, which claims priority to IT Application No. BS2015A000043, filed on Mar. 18, 2015, the contents of each of which is incorporated herein by reference in its entirety.

This invention relates to a telecentric lens for use in an artificial vision device, in particular for making dimensional measurements of objects.

Telecentric lenses are optical systems which are widely used in the field of artificial vision to non-contact measurement of objects thanks to their specific property of collecting cones of light rays coming from the illuminated object whose axis, or main radius, is parallel to the axis of the optical system itself. In this way, in fact, the size of the image created by the lens is independent of the distance at which the observed object is placed and this allows making the measurement of the image more accurate because free of the perspective effects affecting every other type of optics.

This property, called telecentricity, is achieved, as is known, with a lens in which the aperture pupil of the lens is placed optically at infinity with respect to the object observed. This feature is made possible by ensuring that the optical elements placed between the stop of the lens, i.e., the lens aperture, and the observed object create, as a whole, an optical group of positive focus length, the focus position of which coincides with the stop position.

FIG. 1 illustrates, following the conventions in use in optics, a diagram of a telecentric lens 100, of main optical axis k, which creates an image 50 of an object 10 of dimension y1 by means of a front optical group 20, of positive focal length f1 and diameter d1, positioned so that its focus coincides with the position of the stop 30, and a second rear optical group 40 and placed between the stop 30 and the image 50.

In reality, each of the two optical groups, front 20 and rear 40, consists of several optical elements (FIG. 1a) and is thus provided with a thickness and has two main planes, which define the reference planes for the computation of the optical distances between the same two groups and the other elements of the system.

In the diagram of FIG. 1, the front optical group 20 and the rear optical group 40 are indicated with a double arrow that provides an idealised representation in which each of the two optical groups has no thickness and the positions of the two main planes of each group coincide with each other and with the position of the same double arrow. Therefore, in this representation, the distance f1 coincides both with the air space AS, between the element of the front optical group 10 closest to the stop 30 and the stop 30 itself, and with the frontal dimensions L1, i.e., the distance between the outermost element of the front optical group 20, i.e., the element of said group closest to the object 10, and the stop position 30.

According to a particular embodiment of this scheme, it is possible to obtain a bi-telecentric lens, i.e., a lens wherein the or a lens in which the cones of light rays incident on the image plane 50 have their axis or main radius parallel to the main optical axis k.

The realisation of telecentric lenses is only possible if at least one optical element forming part of the front optical group 20 has a diameter d1 greater than the maximum dimension y1 of the object 10 observed. This condition is necessary so that the front optical group 20 is able to collect the rays coming from the object 10. In common practice, d1 can be considered as the maximum diameter of one or more lenses that are part of the front optical group 10.

As the dimension y1 of the object 10 increases, not only the dimension d1, but also the focal length f1, increases. Since an increase of the focal length f1 involves an increase of the frontal dimensions L1, the result is that, as the size of the object observed increases, the lens will not only become of larger diameter but also of ever increasing length.

The reduction of the length and the overall dimensions of telecentric lenses is a recurring requirement of manufacturers of artificial vision systems. The problem is particularly felt when the object 10 to be observed has significant dimensions y1, since, as stated above, the increase of y1 results in a consequent increase of the focal length f1 of the front optical group 20, of the front dimensions L1 and thus of the total length of the optics L1+L2, where L2 is the distance between the stop 30, or lens aperture, and the image plane 50.

To this must be added the fact that the terminal part of the telecentric lens, near the rear optical group 40 and the plane where the image 50 is formed, is normally connected to a camera 60, which contributes to so further increasing the overall length of the assembly.

One way to contain this total length is to contain the dimension of the focal length f1 and consequently of the front dimensions L1, as illustrated for example in FIG. 1b. However, the realisation of a telecentric lens is made much more complex, the lower the ratio f1/d1 between the values d1 and f1, respectively, the focal length and the diameter of the front optical group 20. Since the dimension d1 is determined by the dimension y1 of the object 10, it follows that the manufacture of a telecentric lens, at the same dimension y1, is more complex the smaller the value f1. In fact, the reduction of the ratio f1/d1 involves the use, in the optical system, of a growing number of optical components, causing an increase of costs.

Besides the increase of cost caused by the increased number of optical components, the reduction of the focal length f1, as a tool to obtain a reduction of the overall dimensions of a telecentric lens, involves a reduction of the performance of the telecentric lens itself, since the individual optical components of the front optical group 20 of the telecentric lens must, of necessity, have a greater power and greater curvature, characteristics that make the maintenance of adequate optical performance complex, if not impossible.

The object of the present invention is to considerably reduce the overall dimensions of a telecentric lens and, in particular, the maximum dimensions represented by the total length, L1+L2, of the optics, without increasing the number of optical elements of the front optical group and without worsening the optical performance of the lens.

This object is achieved, as will be shown below and in accordance with claim 1, through the introduction of reflective or semi-reflective optical elements in the optical path of the telecentric lens itself and, in particular, between the front optical group and the lens aperture, so that at least a part of the rays coming from the front optical group undergoes at least one double reflection before reaching the rear optical group.

The characteristics and advantages of the telecentric lens according to the invention will, in any case, be evident from the following description of its preferred embodiments, provided by way of non-limiting example, with reference to the accompanying figures, wherein:

FIG. 1a shows an embodiment of a telecentric lens according to the prior art;

FIG. 1b shows a telecentric lens wherein the front optical group 20 comprises, with respect to the group of FIG. 1a, additional optical elements to reduce the distance L1 between the outermost element of the front optical group and the lens aperture;

Figure 1:
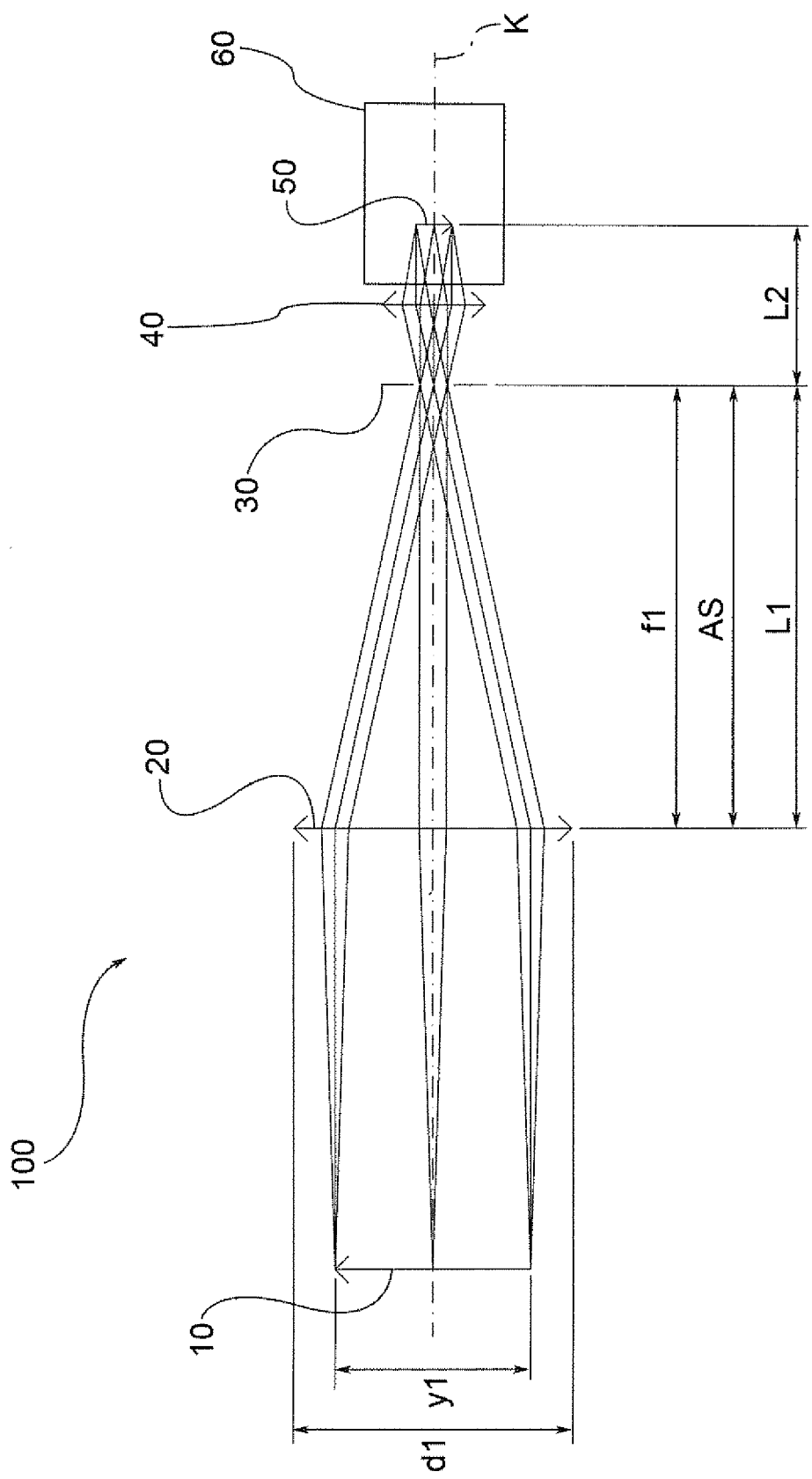
FIG. 1 shows the optical scheme of a telecentric lens according to the prior art.

According to a general embodiment, a telecentric lens according to the invention comprises a front optical group 20 suitable to receive rays coming from an observed object 10 and defining a front optical axis k, at least a first rear optical group 40, suitable to convey said rays towards a sensor 60 and defining a rear optical axis k', and at least one lens aperture 30 positioned between the front optical group 20 and a respective rear optical group 40.

The lens aperture 30 lies on the focal plane of at least the front optical group 20, in such a way that the axis of each cone of rays coming from the observed object 10 is parallel to the front optical axis k.

An image of the object 10 is formed on an image plane 50 of sensor 60.

In a preferred embodiment illustrated in the drawings, the telecentric lens is a bi-telecentric lens, i.e., a lens wherein the cones of light rays incident on the image plane 50 have their axis or main radius parallel to the main optical axis k'.

According to an aspect of the invention, in the air space (AS) between the front optical group 20 and the lens aperture 30 are inserted at least two reflective or semi-reflective elements 70, 71 arranged in such a way that at least a part of the rays coming from the front optical group 20 undergoes at least one double reflection before reaching the rear optical group 40.

In particular, the reflective or semi-reflective elements 70, 71 are arranged in such a way that said double reflection generated by them involves, with respect to a telecentric lens without such elements, a reduction of the distance between the front optical group 20 and the rear optical group 40.

Figure 2:
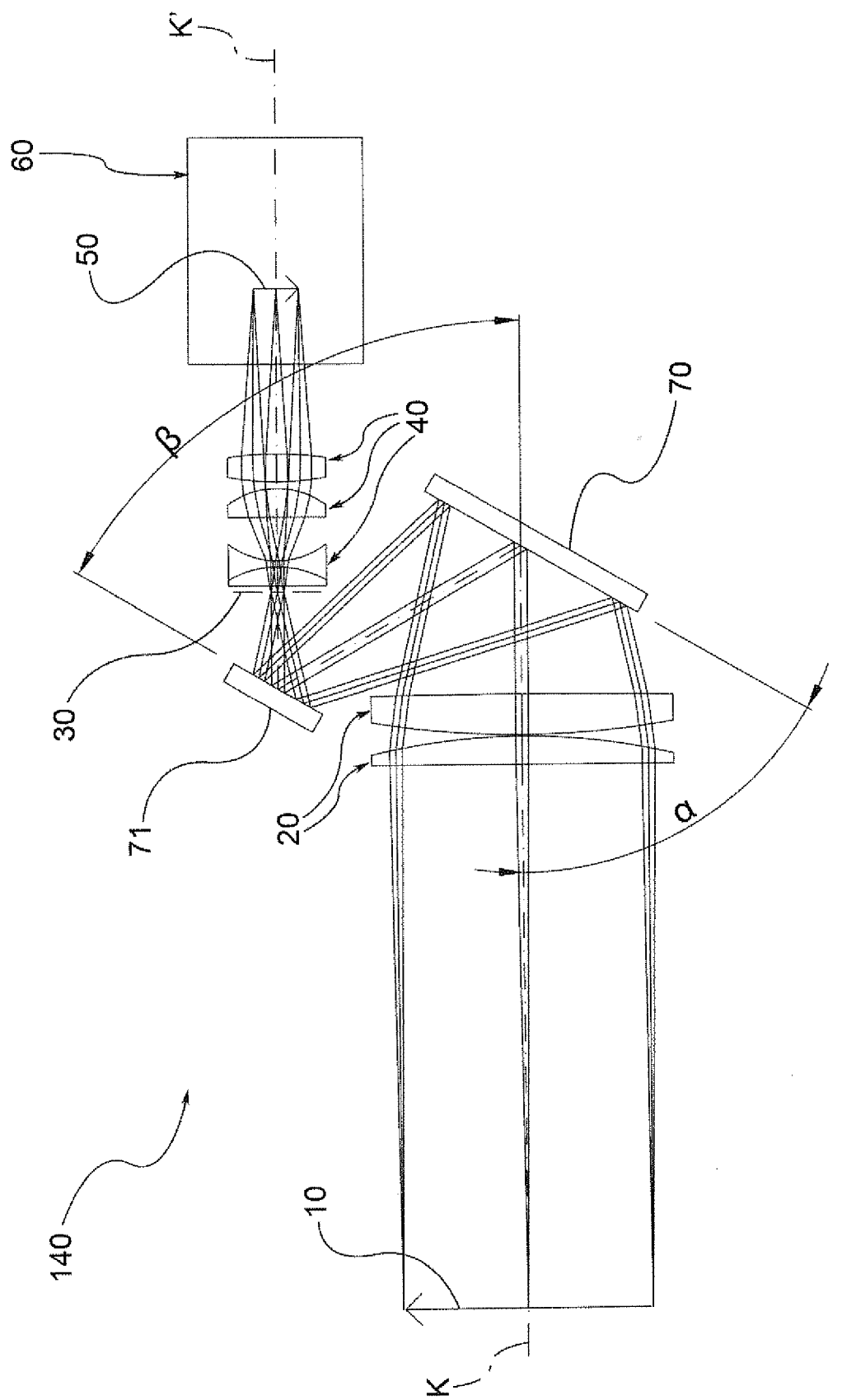
FIG. 2 shows the optical scheme of a telecentric lens according to the invention, in a first embodiment.

In an embodiment illustrated in FIG. 2, the telecentric lens 140 comprises two reflective elements 70, 71. A first reflective element 70 is suitable to reflect the rays exiting from the front optical group 20 in a direction such that these reflected rays intersect the rays exiting from the front optical group 20.

Preferably, the first reflective element 70 is arranged in such a way that the rays reflected by it intersect the rays exiting from the front optical group 20 without interfering with the latter. This embodiment is obtained by adopting an angle of first reflection (α) between the reflective surface of the first reflective element 70 and the direction, before each reflection, of the front optical axis k, of a value greater than 25° and less than 75°.

The second reflective element 71 reflects the rays coming from the first reflective element 70 in a direction such as to allow the minimisation of the overall dimensions of the telecentric lens 140 realised according to this scheme. The angle of first reflection (α) between the reflective surface of the first reflective element 71 and the direction, before each reflection, of the front optical axis k, is preferably of an absolute value greater than 30° and less than 90°.

According to a particular embodiment of this configuration, after the reflection made by the second reflecting element 71, the rear optical axis k' is parallel to direction of the front optical axis k.

Figure 3:
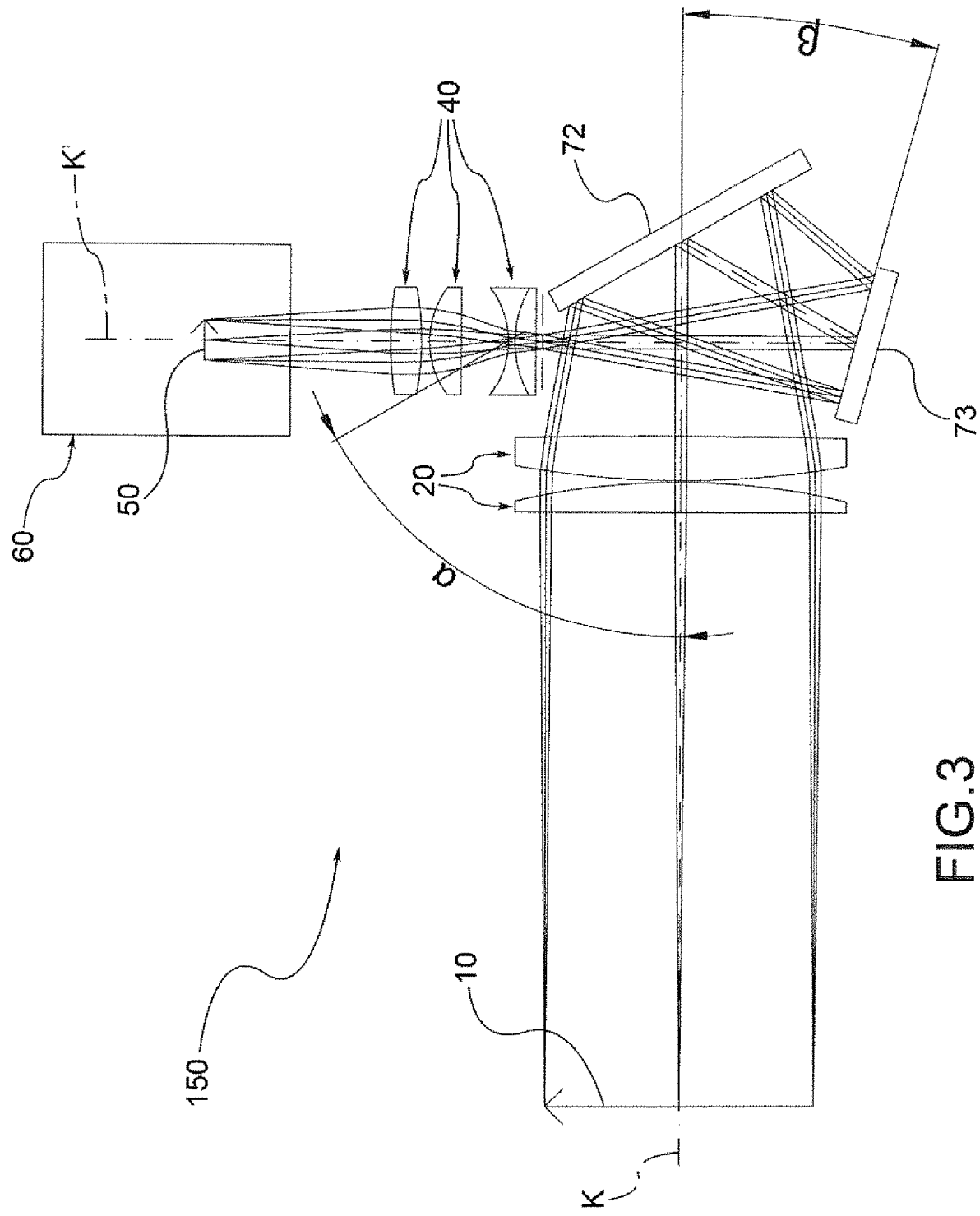
FIG. 3 shows the optical scheme of a telecentric lens according to the invention, in a second embodiment.

FIG. 3 shows another embodiment of a telecentric lens 150 according to the invention, wherein the reduction of the overall dimensions of the optics is obtained thanks to the use of two reflective elements 72,73, oriented and arranged as described below.

A first reflective element 72 has its own reflective surface, which forms an angle of first reflection (a) with respect to the direction, before each reflection, of the front optical axis k, with a an absolute value comprised between 15° and 75°; the second reflective element 73 has an angle of second reflection (β) of its reflective surface with respect to the direction, before each reflection, of the front optical axis k, of an absolute value comprised between 0° and 30°. The reflective elements 72, 73 are then positioned in space so that the reflection made by the second reflective element 73 allows the ray coincident with the rear optical axis k' to intercept the ray coincident with front optical axis k in the vicinity of the front optical group 20.

The reflective elements 72, 73 are also positioned in such a way that no optical element interferes with the path of the optical rays with the exception of the reflections and refractions necessary for the formation of the image 50.

In the embodiment illustrated, the angles of the reflective elements 72, 73 are chosen in such a way that, after the last reflection, the rear optical axis k' is perpendicular to the front optical axis k.

In the embodiments of FIGS. 2 and 3 just described, the rear optical axis k' and the front optical axis k are coplanar with each other.

Figure 4:
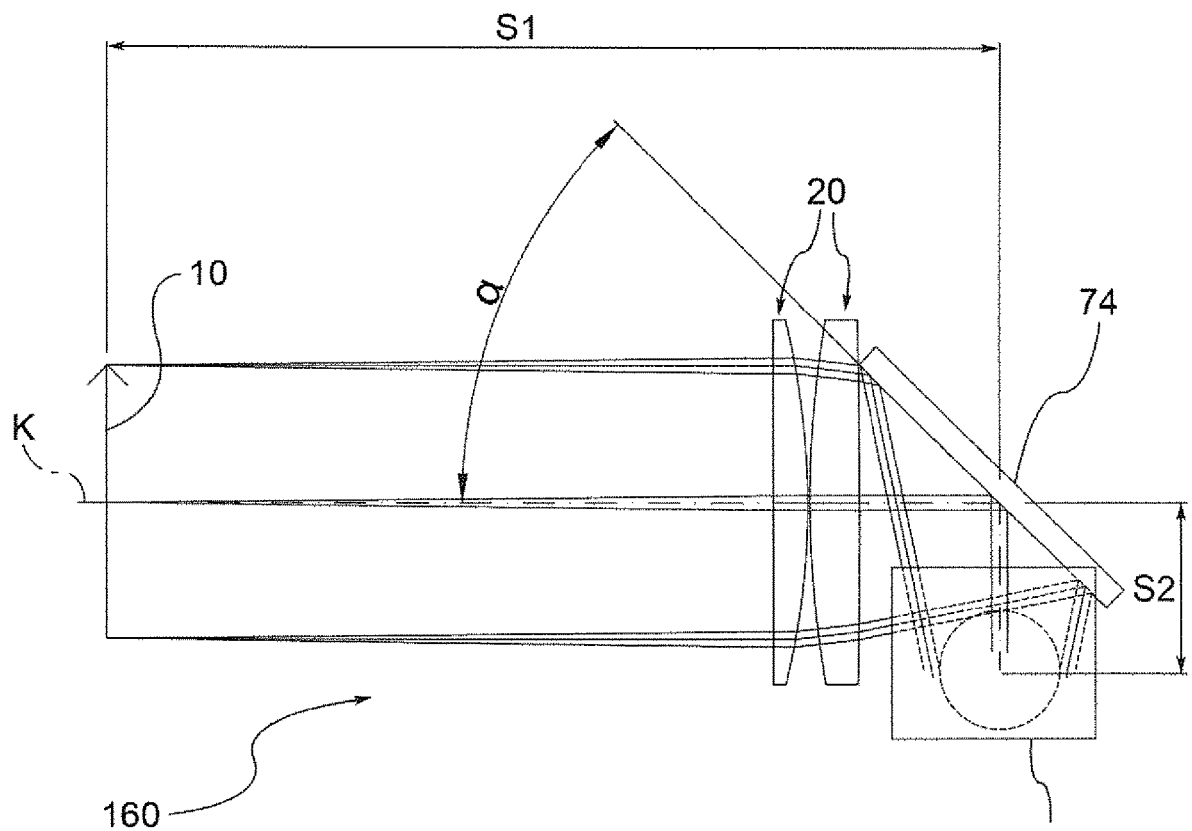
FIGS. 4 and 4a show two orthogonal views of the optical scheme of a telecentric lens according to the invention, in a third embodiment.
Figure 4A:
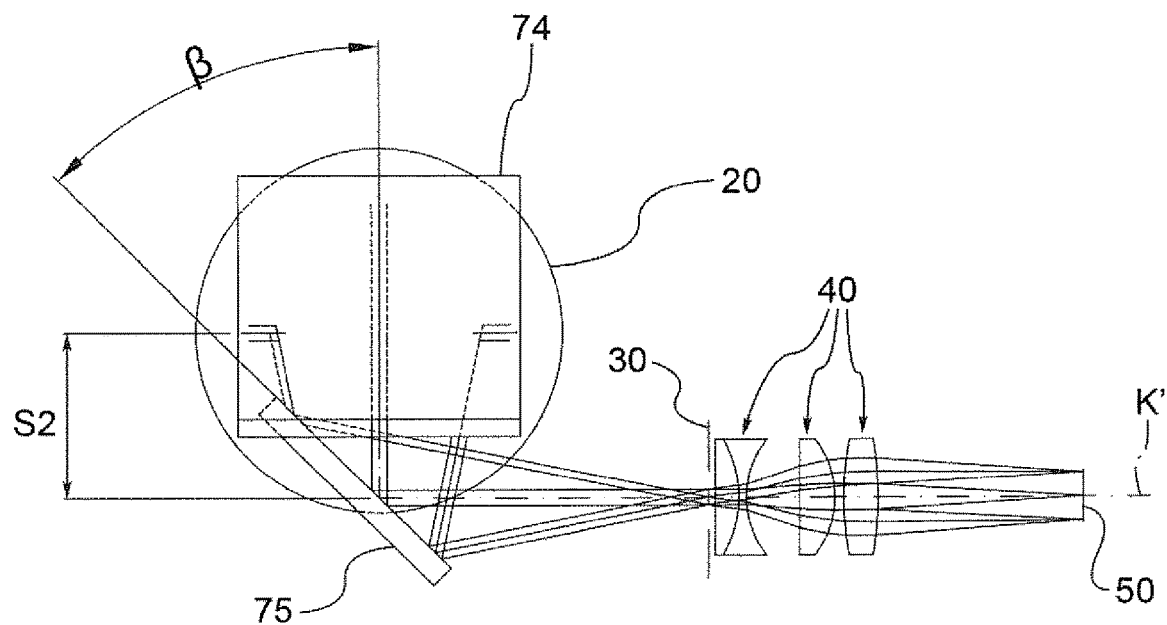

While, in the embodiment illustrated in FIGS. 4 and 4a, the rear optical axis k' and the front optical axis k lie are different planes.

In the telecentric lens 160 of FIGS. 4 and 4a, the reduction of dimensions is obtained by using two reflective elements 74 and 75 oriented and arranged in the following way. A first reflective element 74 has its own reflective surface, which forms an angle of first reflection (α) with respect to the direction, before each reflection, of the front optical axis k, with a an absolute value comprised between 25° and 75°; the second reflective element 75 has its own reflective surface that forms, with the front optical axis k, considering its direction after the reflection by the first reflective element 74, an angle of second reflection (β) of an absolute value comprised between 25° and 75°. The reflection made by the second reflective element 75 is such as to result in a deviation of the front optical axis k outside the plane on which lie the two segments S1, S2 front optical axis k defined respectively by the path between the object 10 and the first reflecting element 74 and by the path between the first reflecting element 74 and the second reflecting element 75.

Figures 5, 5A:
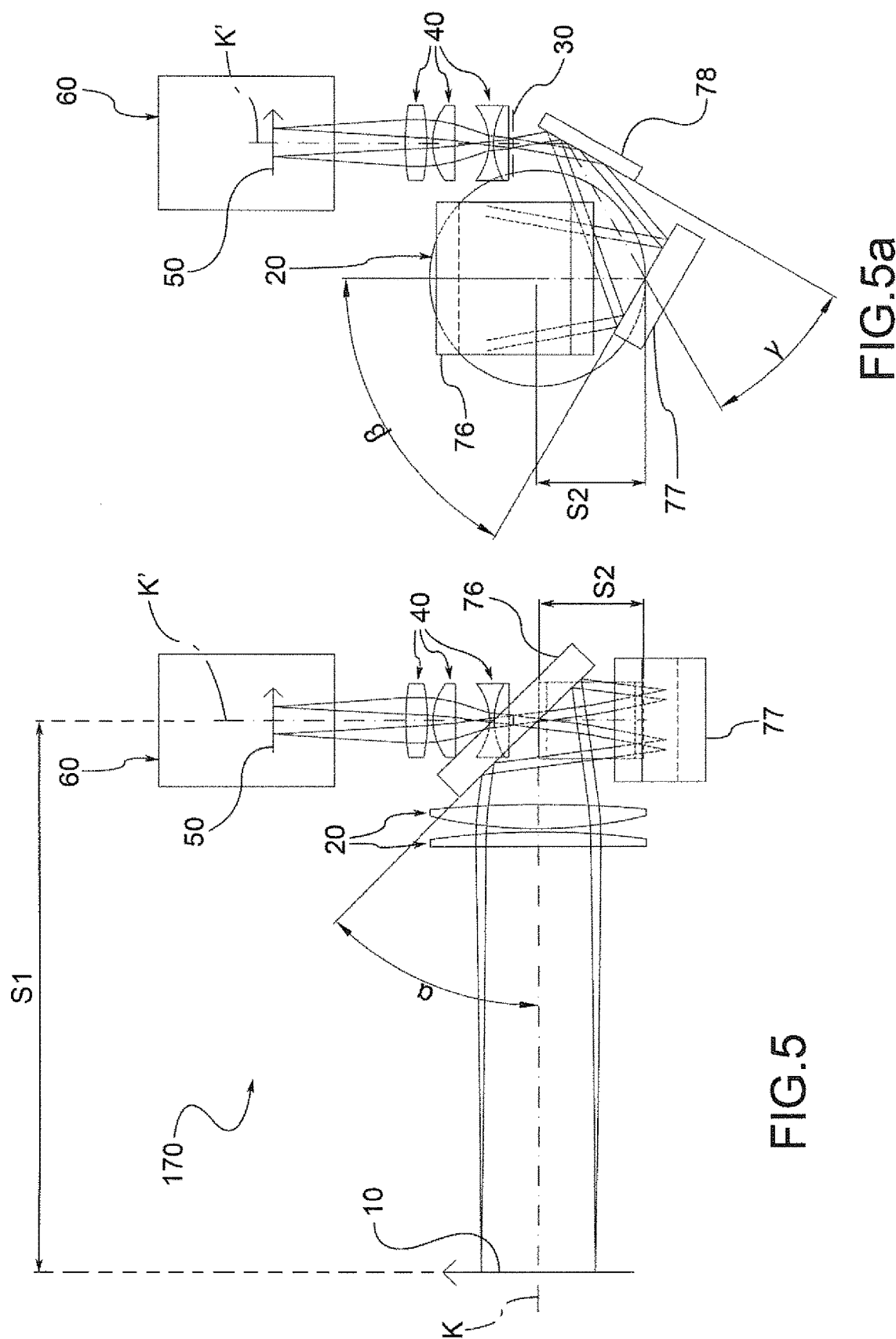
FIGS. 5, 5a and 5b are two orthogonal views and a perspective view of the optical scheme of a telecentric lens according to the invention, in a fourth embodiment.
Figure 5B:
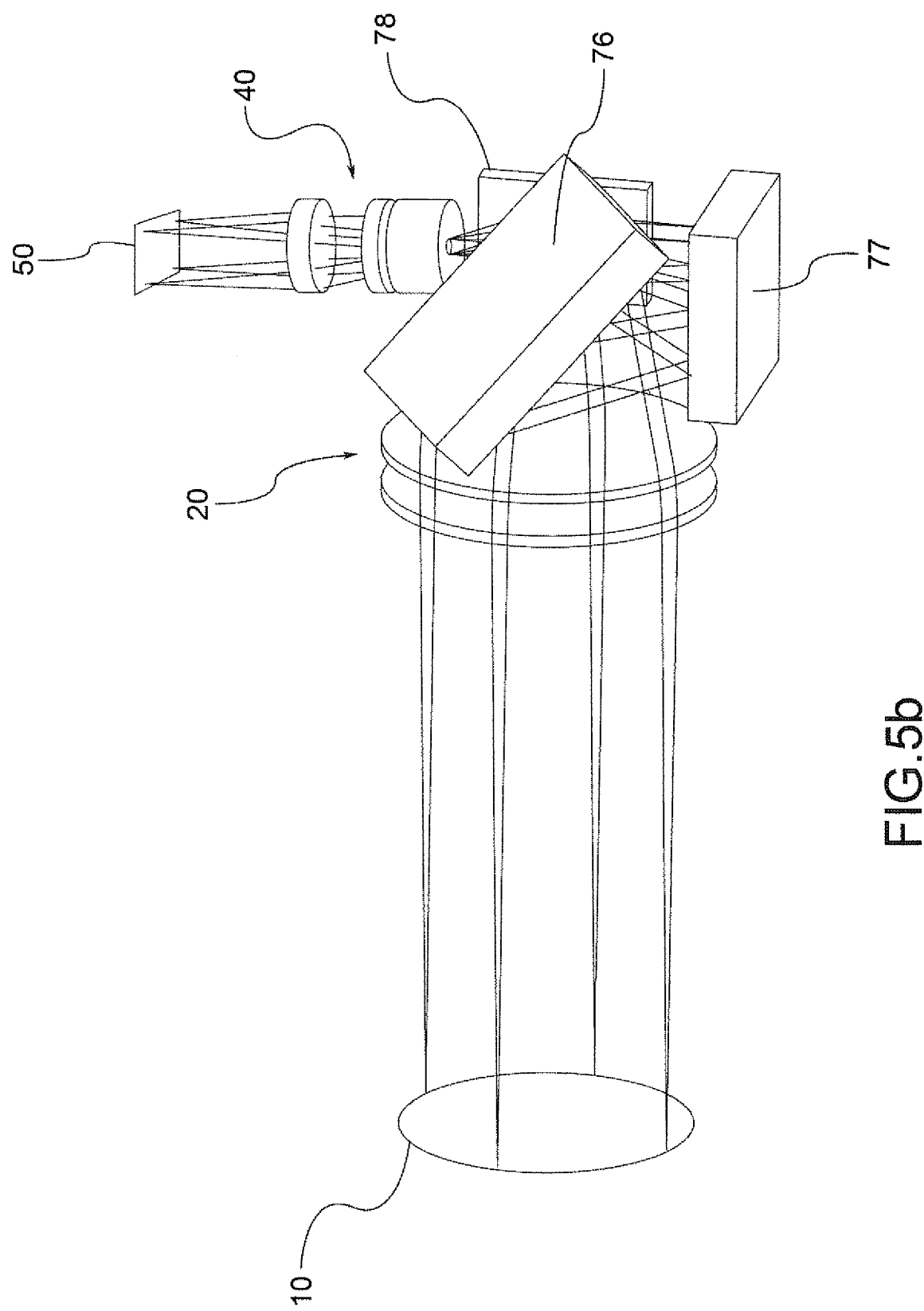

In a further embodiment illustrated in FIGS. 5, 5*a* and 5*b*, there is a reduction of the overall dimensions of a telecentric lens 170 by means of three reflective elements 76, 77, 78.

A first reflective element 76 has its own reflective surface that forms, with the front optical axis k before any reflection of it, an angle of first reflection (α) of an absolute value comprised between 25° and 75°. A second reflective element 77 has its own reflective surface that forms, with the front optical axis k, after its reflection made by the first reflective element 76, an angle of second reflection (β) of an absolute value comprised between 25° and 75°. The reflection made by the second reflective element 77 is such as to result in a deviation of the front optical axis k outside the plane on which lie the two segments S1, S2 front optical axis k defined respectively by the path between the object 10 and the first reflecting element 76 and by the path between the first reflecting element 76 and the second reflecting element 77. A third reflective element 78 has its own reflective surface that forms, with the main optical axis k, after its reflection made by the second reflective element 77, an angle of third reflection (γ) of an absolute value comprised between 10° and 45°.

After the reflection made by the third reflective element 78, the front optical axis K, which after such reflection coincides with the rear optical axis K', is thus not coplanar with segment s1 of the front optical axis before the reflection made by the first reflective element 76.

This solution allows obtaining a particularly compact telecentric lens 170, as shown in the perspective view of FIG. 5*b*.

According to a preferred embodiment of this scheme, the angle of reflection α is equal to 45°, the angle of second reflection β is equal to 60° and the angle of third reflection γ is equal to 15°. In this way, the rear optical axis k' is orthogonal but not coplanar to the front optical axis k before the reflection made by the first reflective element 76 and, thanks to the use of three reflective elements, the distance between the front optical group 20 and the rear optical group 40 is further reduced with respect to the embodiments with two reflective elements illustrated in FIGS. 3 and 4.

In the practical embodiments described above, the optical elements inserted between the front optical group and the lens aperture are reflective optical elements. In some further embodiments, one or more optical elements can be realised achieved with reflective optical elements that are flat, spherical, aspherical or irregular, such as reflective or semi-reflective mirrors, or with optical prisms with one of their own reflective or semi-reflective surfaces.

Figure 6:
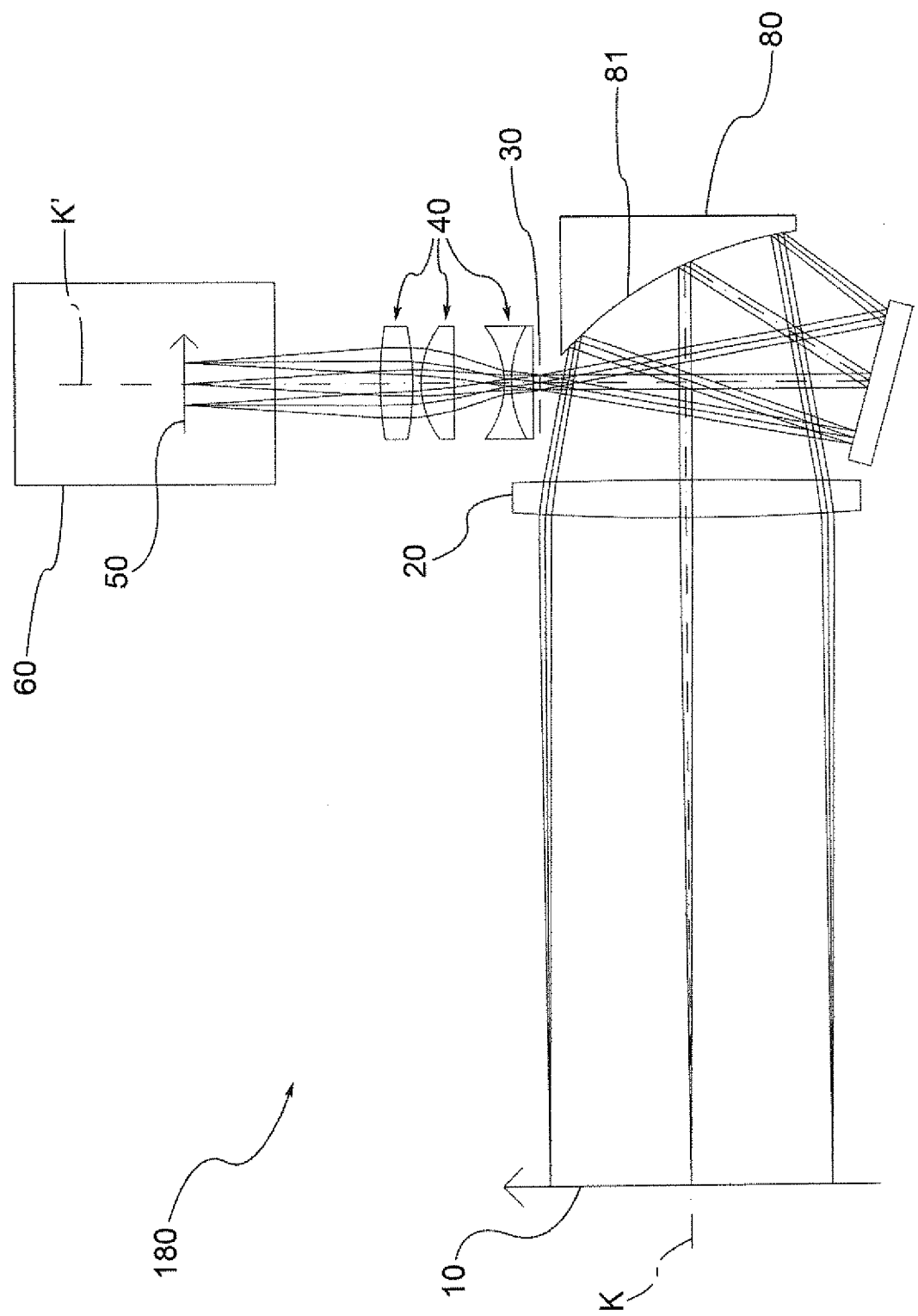
FIGS. 6 to 10 show the optical schemes of telecentric lens according to the invention, in as many further embodiments.

With reference to FIG. 6, a telecentric lens 180 has a reflective optical element 80 comprising a curved reflective optical surface 81, or provided with optical power. Advantageously, in this configuration, it is possible to reduce the power and number of the other optical elements of the same optical system, in particular of the elements that refract the light (lenses) present in the front optical group 20 and in the rear optical group 40, thus obtaining an optical system more compact and less sensitive to chromatic aberrations, since the reflective elements behave in a manner neutral to the various wavelengths. Such a curved surface may be of any shape, i.e., spherical, aspherical or irregular, so as to be able to correct, in the best way, the residual aberrations of the optical system, or correct its focusing.

Figure 7:
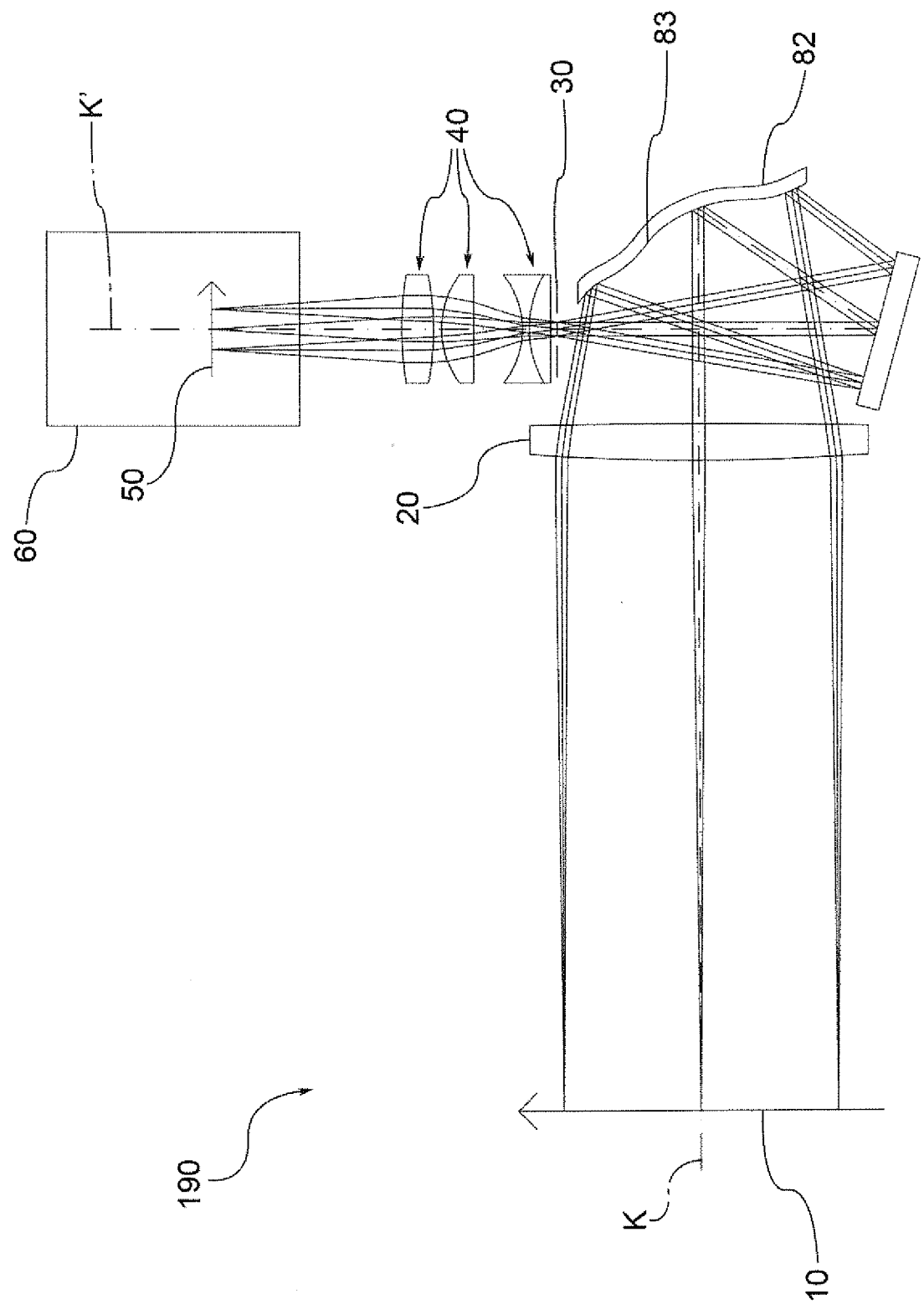

In an embodiment the telecentric lens 190 illustrated in FIG. 7, at least one reflective optical element 82 of the optical system comprises a reflective optical surface 83 mechanically deformable so as to adapt the reflection geometry to particular optical requirements, such as, for example, the correction of the smallest optical aberrations or a compensation of the decentralisation of other optical elements of the lens itself, or further ensure the correction of the focusing of the entire optical system.

Figure 8:
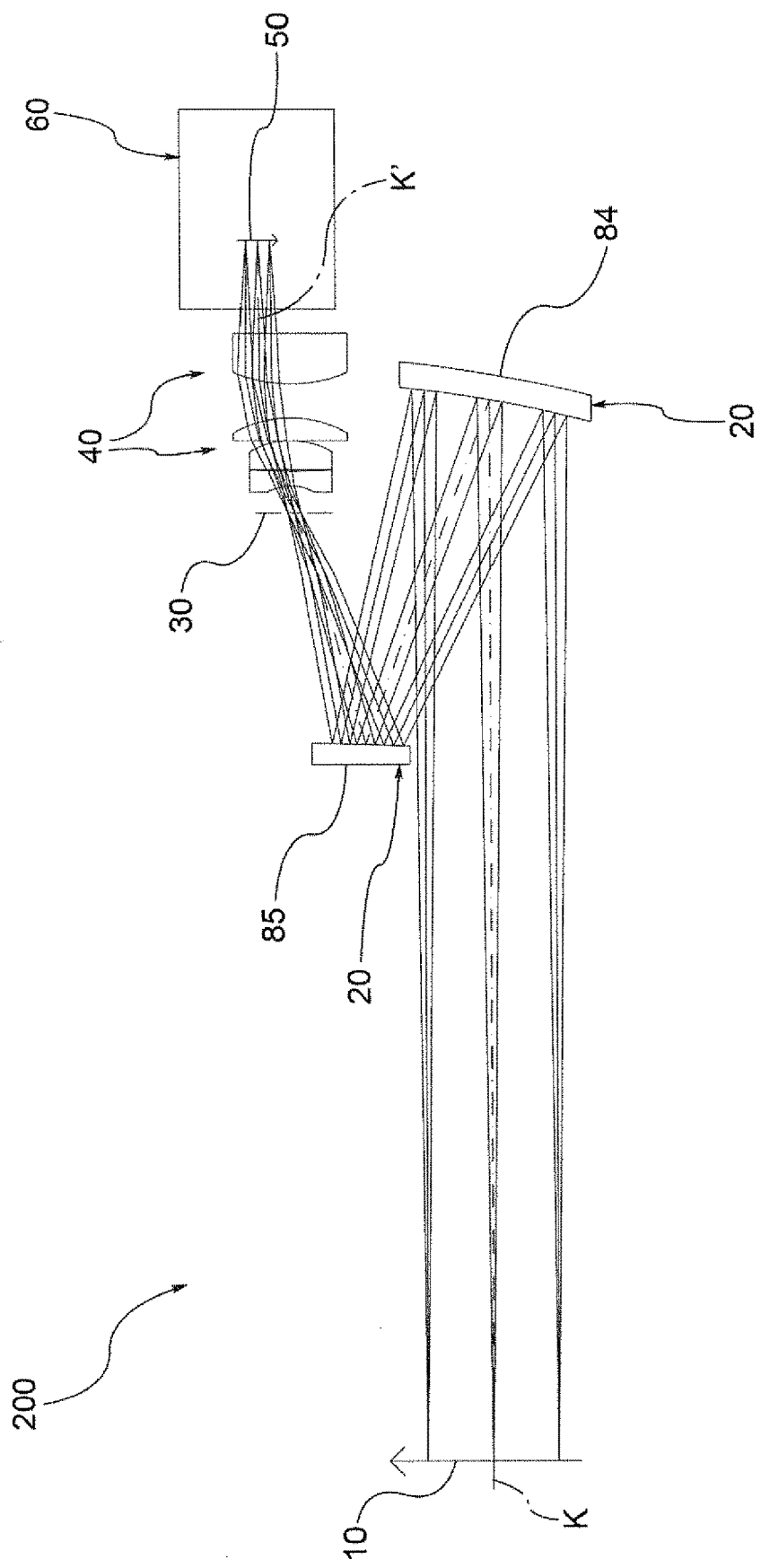

FIG. 8 shows a telecentric lens 200 wherein the entire front optical group 20 is replaced by one or more reflective optical elements 84, 85, for example of spherical, aspherical or irregular curved shape, such as to allow a particularly compact and simple realisation of the telecentric lens and without any chromatic aberration in the front part. Since the telecentricity of the lens depends on the characteristics of the front optical group 20, the absence of chromatic effects is of the utmost importance in order to ensure the same performance of the optics in terms of telecentricity, irrespective of the length of wave employed.

Figure 9:
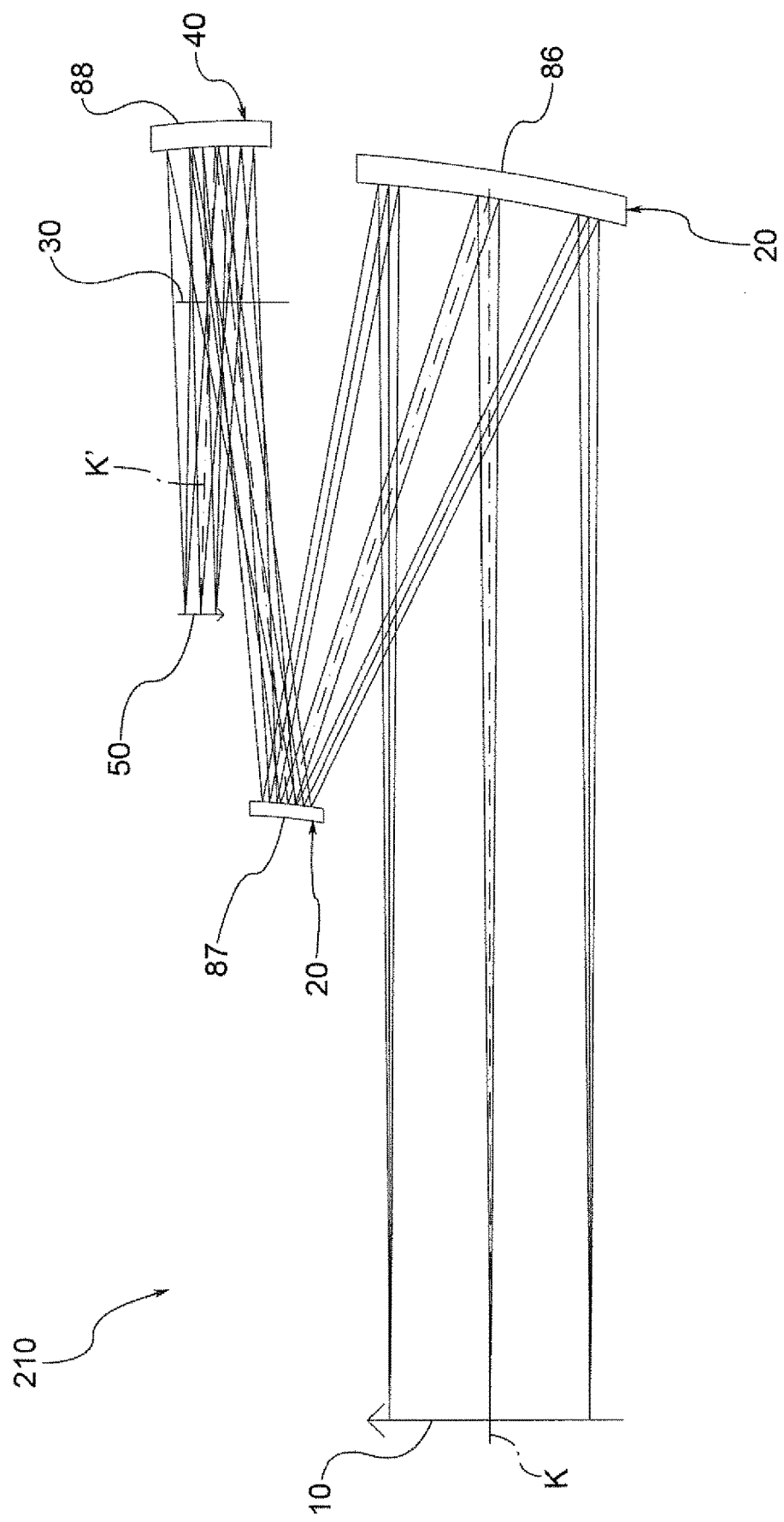

In an embodiment illustrated in FIG. 9, not only the entire front optical group 20 of a telecentric lens 210 is replaced by one or more reflective optical elements 86, 87 of spherical, aspherical or irregular curved shape, but also the rear optical group 40 is replaced by one or more reflective optical elements 88 of spherical, aspherical or irregular curved shape. In this way, one obtains an embodiment of the telecentric lens entirely free of refractive elements and therefore usable in any range of optical wavelengths with the same performance.

Figure 10:
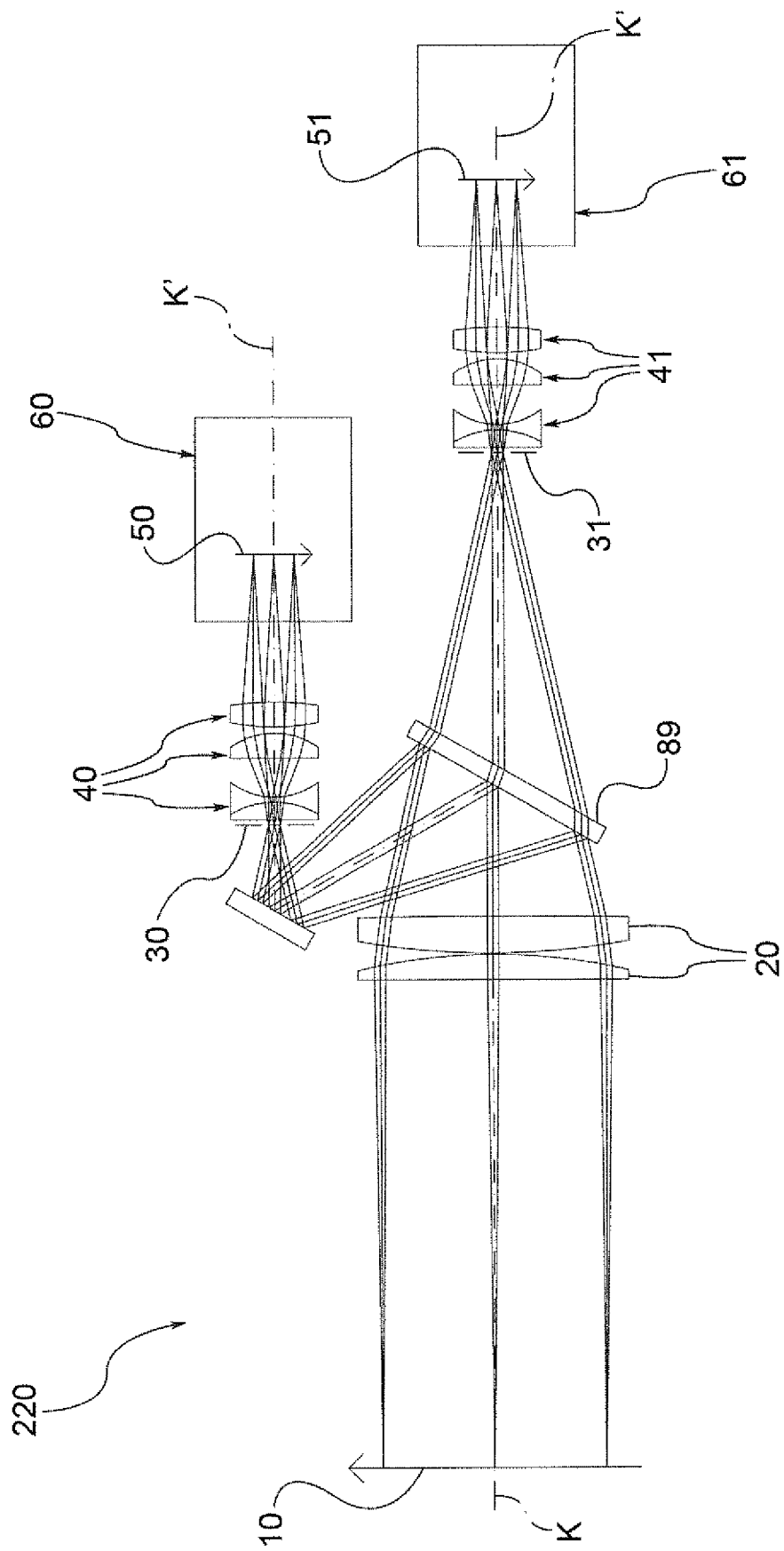

In a further embodiment of a telecentric lens 220 illustrated in FIG. 10, at least one of the reflective optical elements is realised with a semi-reflective mirror 89, also known as a beam splitter. This semi-reflective mirror 89 is such as to allow a part of the incident rays to be reflected and another part to be transmitted. In this way it is possible to add one or more rear optical groups 41, in correspondence of each semi-reflective element 89 thus realised, so as to be able to use the same front optical group 20 in order to obtain one or more additional images 51 of the object 10 observed.

Figure 11:
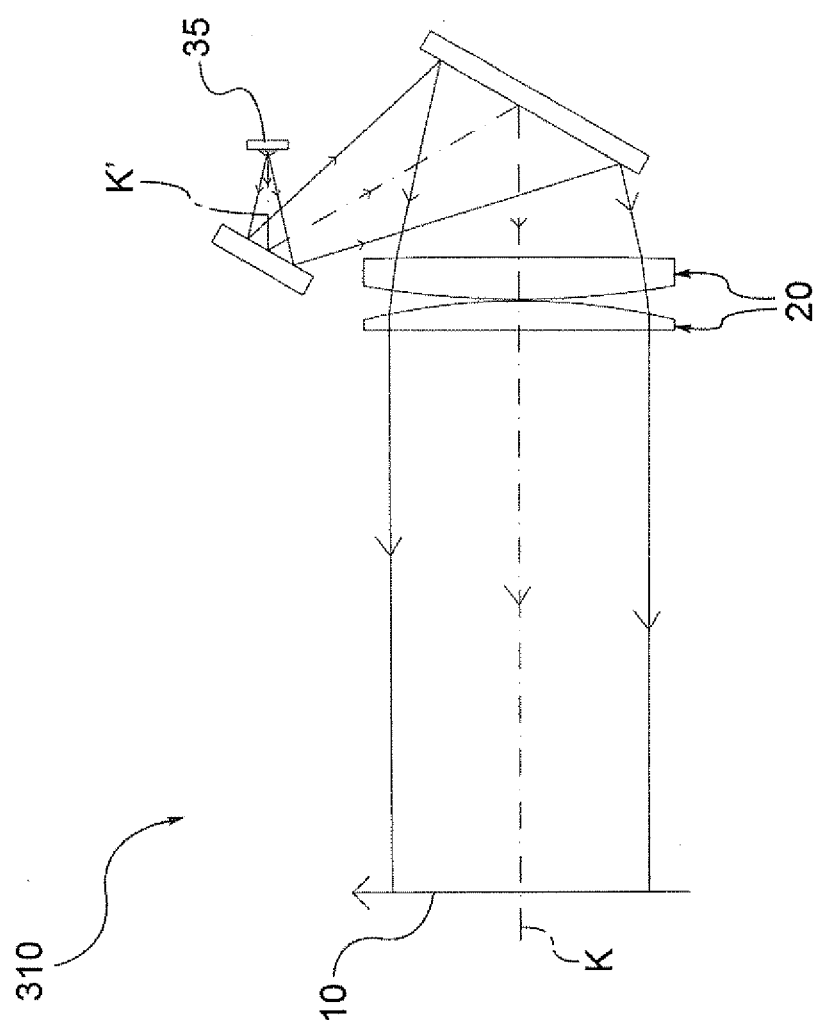
FIG. 11 is an optical scheme of a collimated light source that employs an optical scheme of the telecentric lens according to the invention.

FIG. 11 shows how it is possible, using the teaching of the present invention, to obtain a particularly compact collimated light source 310 by replacing the rear optical group 40 of a telecentric lens realised according to any of the configurations shown thus far, with a light source 35, in such a way that the centre of the emitting area of said light source 35 coincides with the position of the lens aperture 30.

Figure 12:
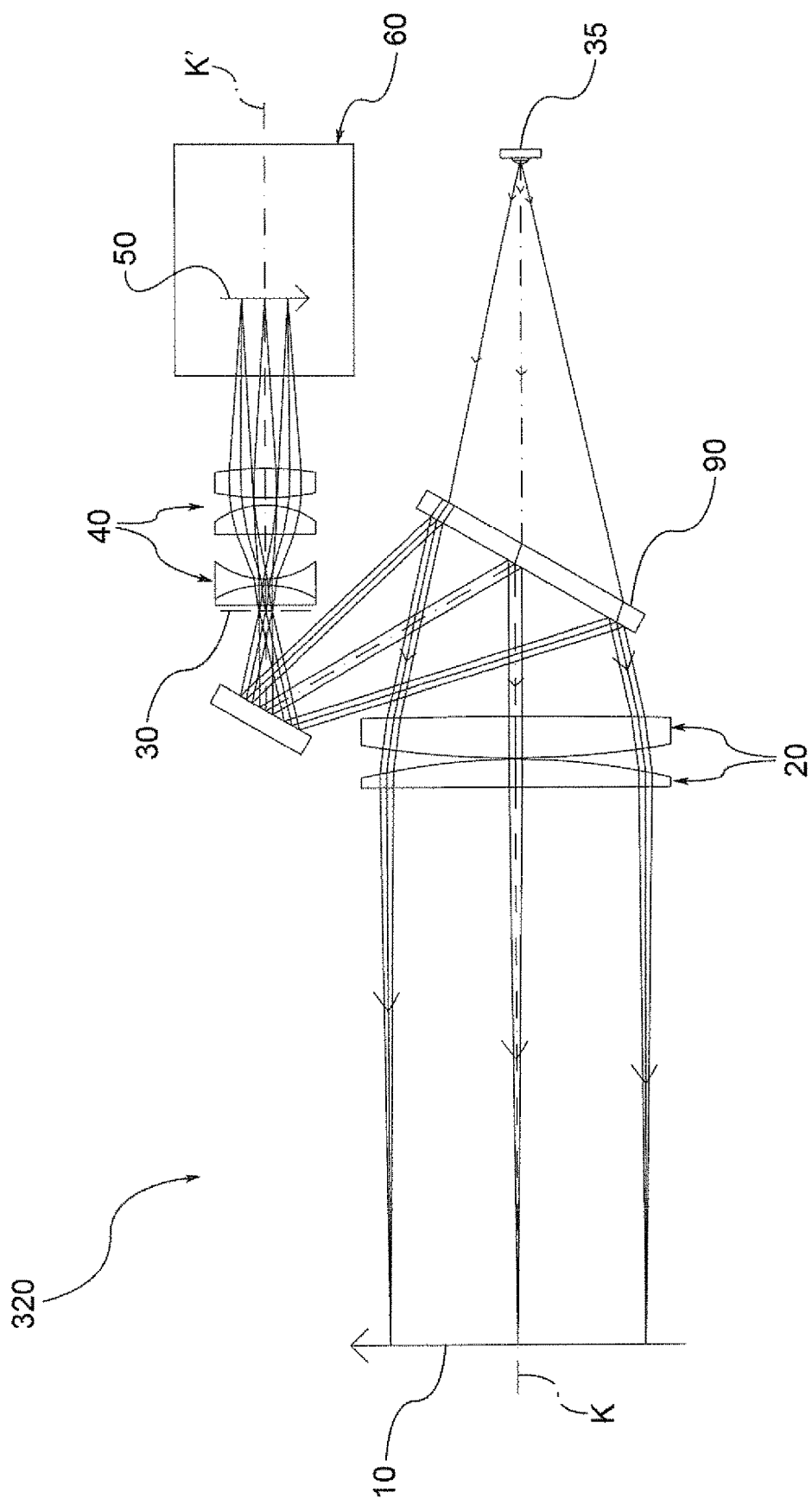
FIG. 12 is an optical diagram of a telecentric lens according to the invention provided with a collimated light source.

FIG. 12 shows how one can obtain, from the combination of two or more reflective optical elements, of which one 90 realised so as to be semi-reflective, a particularly compact telecentric lens 320, according to any of the configurations illustrated above, which allows simultaneously obtaining a collimated illumination that uses the same front optical group 20 for the projection of the rays towards the object 10.

To the forms of embodiment of the telecentric lens according to the invention, a technician in the field, to satisfy contingent requirements, may make modifications, adaptations and replacements of members with others functionally equivalent, without departing from the scope of the following claims. Each of the characteristics described as belonging to a possible embodiment can be achieved independently from the other embodiments described.

The invention claimed is:
1. A telecentric lens, comprising:
   a front optical group configured to receive rays coming from an observed object and defining a front optical axis (k), at least a first rear optical group, suitable to convey said rays towards a sensor and defining a rear optical axis (k'), and at least one lens aperture positioned between the front optical group and a respective rear optical group, where the lens aperture lies on the focal plane of, at least, the front optical group such that the axis of each cone of rays coming from the observed object is parallel to said front optical axis, wherein at least three reflective or semi-reflective elements are arranged in the air space (AS) between the front optical group and the lens aperture such that the reflection made by a second reflective or semi-reflective element causes a deviation of the front optical axis (k) outside of the plane upon which lies said front optical axis, before and after the first reflection made by a first reflective or semi-reflective element.

2. The telecentric lens of claim 1, wherein the reflective or semi-reflective elements are arranged in such a way that said double reflection involves, with respect to a telecentric lens without such elements, a reduction of the distance between the front optical group and the rear optical group.

3. The telecentric lens of claim 1, comprising two reflective elements, the first reflective element being suitable to reflect the rays exiting from the front optical group in a direction such that these reflected rays intersect the rays exiting from the front optical group.

4. The telecentric lens of claim 3, wherein the first reflective element is arranged in such a way that the rays reflected by said first reflective element intersect the rays exiting from the front optical group without interfering with the front optical group.

5. The telecentric lens of claim 4, wherein the reflective surface of the first reflective element and the front optical axis form an angle of first reflection ($\alpha$) of between 15° and 75°.

6. The telecentric lens of claim 1, wherein the reflective surface of the second reflective element and the front optical axis (k) form an angle of second reflection ($\beta$) of between 30° and 90°.

7. The telecentric lens of claim 1, wherein said reflective or semi-reflective elements are arranged in such a way that the rear optical axis (k') is substantially perpendicular to the front optical axis (k).

8. The telecentric lens of claim 7, wherein the front optical axis and the rear optical axis are coplanar.

9. The telecentric lens of claim 8, wherein the reflective or semi-reflective elements and are then positioned in space so that the reflection made by the second reflective or semi-reflective element allows the ray coincident with the front optical axis (k) to intercept itself in the vicinity of the front optical group.

10. The telecentric lens of claim 9, wherein the reflective surface of the first reflective or semi-reflective element forms with the front optical axis (k) an angle of first reflection ($\alpha$) whose absolute value is between 15° and 75° and wherein the reflective surface of the second reflective or semi-reflective element forms with the front optical axis (k) an angle of second reflection ($\beta$) whose absolute value is between 0° and 30°.

11. The telecentric lens of claim 7, wherein the front optical axis (k) and the rear optical axis (k') belong to different planes.

12. The telecentric lens of claim 11, wherein the reflective surface of the first reflective or semi-reflective element forms with the front optical axis (k) an angle of first reflection ($\alpha$) whose absolute value is between 25° and 75° and wherein the reflective surface of the second reflective or semi-reflective element forms with the front optical axis (k), after the first reflection, an angle of second reflection ($\beta$) whose absolute value is between 25° and 75°.

13. The telecentric lens of claim 1, wherein
the first reflective or semi-reflective element has an angle of first reflection ($\alpha$) of its reflective surface with respect to the direction, before any reflection, of the main optical axis (k), whose absolute value is between 25° and 75°, the second reflective or semi-reflective element has a angle of second reflection ($\beta$) of its reflective surface with respect to the front optical axis (k), given its direction after the reflection by the first reflective or semi-reflective element, whose absolute value is between 25° and 75°, and the third reflective or semi-reflective element has an angle of third reflection ($\gamma$) of its reflective surface with respect to the main optical axis (k), given its direction after the reflection by the second reflective or semi-reflective element, whose absolute value is between 10° and 45°, wherein the reflection made by the second reflective or semi-reflective element causes a deviation of the front optical axis (k) outside the plane on which lies said front optical axis before and after the first reflection made by the first reflective or semi-reflective element.

14. The telecentric lens of claim 1, wherein the angle of first reflection ($\alpha$) is equal to 45°, the angle of second reflection ($\beta$) is equal to 60° and the angle of third reflection ($\gamma$) is equal at 15°.

15. The telecentric lens of claim 1, wherein one or more of the reflective or semi-reflective optical elements comprises a reflective optical surface curved, for example spherical, aspherical or irregular, in order to correct the residual aberrations of the optical system or the focus.

16. The telecentric lens of claim 1, wherein one or more of the reflective or semi-reflective optical elements comprises a mechanically deformable reflective optical surface.

17. The telecentric lens of claim 1, wherein at least one of said reflective or semi-reflective optical elements is a semi-reflective optical element and wherein the telecentric lens comprises at least a second rear optical group and at least a second lens aperture positioned between the front optical group and said second rear optical group being suitable to convey part of the rays coming from the front optical group to a second sensor.

18. The telecentric lens of claim 1, wherein at least one of the reflective or semi-reflective elements is provided with optical power or is a beam splitter.

* * * * *